ANALOG TO DIGITAL CONVERTER WITH INTERFERENCE SIGNAL REJECTION

Filed Nov. 5, 1964

INVENTORS
PAUL M. HAAS
FORREST G. HIBBITS
BY
Richard K. Macneill

United States Patent Office 3,354,453

Patented Nov. 21, 1967

3,354,453

ANALOG TO DIGITAL CONVERTER WITH INTERFERENCE SIGNAL REJECTION

Forrest G. Hibbits and Paul M. Haas, San Diego, Calif., assignors, by mesne assignments, to Honeywell Inc., Minneapolis, Minn., a corporation of Delaware Filed Nov. 5, 1964, Ser. No. 409,081

5 Claims. (Cl. 340—347)

Figure 1:
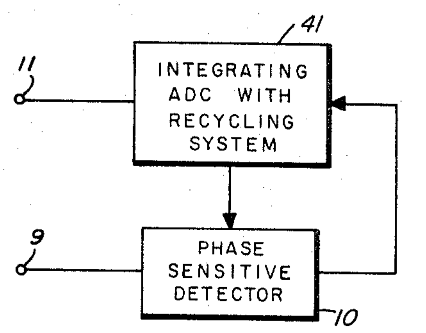

The present invention relates to an analog to digital converter and more particularly to an analog to digital converter having a high interference signal rejection which is automatic.

This application is a continuation-in-part of our co-pending application, Serial No. 384,762, filed July 23, 1964, for Analog to Digital Converter.

According to the invention, an integrating analog to digital converter such as that disclosed in the above-referenced co-pending application, is supplied with a voltage controlled recycling system, i.e., a recycling system which recycles the analog to digital converter automatically and periodically, with a frequency dependent upon an input voltage to the recycling system. When an interference signal exists, this signal is presented to one input of a phase sensitive detector which has another input connected to a multiple of the analog to digital converter recycling system frequency. The output of the phase sensitive detector is utilized to control a voltage controlled means such as a voltage controlled oscillator which in turn determines the frequency of recycling in the analog to digital converter. Hence, if a point is selected in the recycling system for comparison with the interference signal at the phase sensitive detector, the phase sensitive detector will drive the recycling system until there is no output from the phase sensitive detector. At this time, the recycling frequency of the analog to digital converter is a submultiple of the interfering frequency, and, if the analog to digital converter is of the integrating type, the interfering signal will have an integral of zero, resulting in no effect on the readout of the analog to digital converter.

A further novel feature of the invention lies in supplying the phase sensitive detector with a sense by setting the phase of the reference interference signal in relationship with the timing of the readout cycle of the analog to digital converter.

An object of the present invention is the provision of an analog to digital converter with extremely high interference signal rejection.

A further object of the invention is the provision of an analog to digital converter in which interference signal rejection is accomplished automatically.

Another object is to provide an analog to digital converter in which interference signal rejection is accomplished automatically without effecting the readout calibration of the analog to digital converter.

Yet another object of the invention is the provision af an analog to digital converter with high interference signal rejection which is simple, inexpensive and requires a minimum of maintenance and adjustment.

Figure 2:
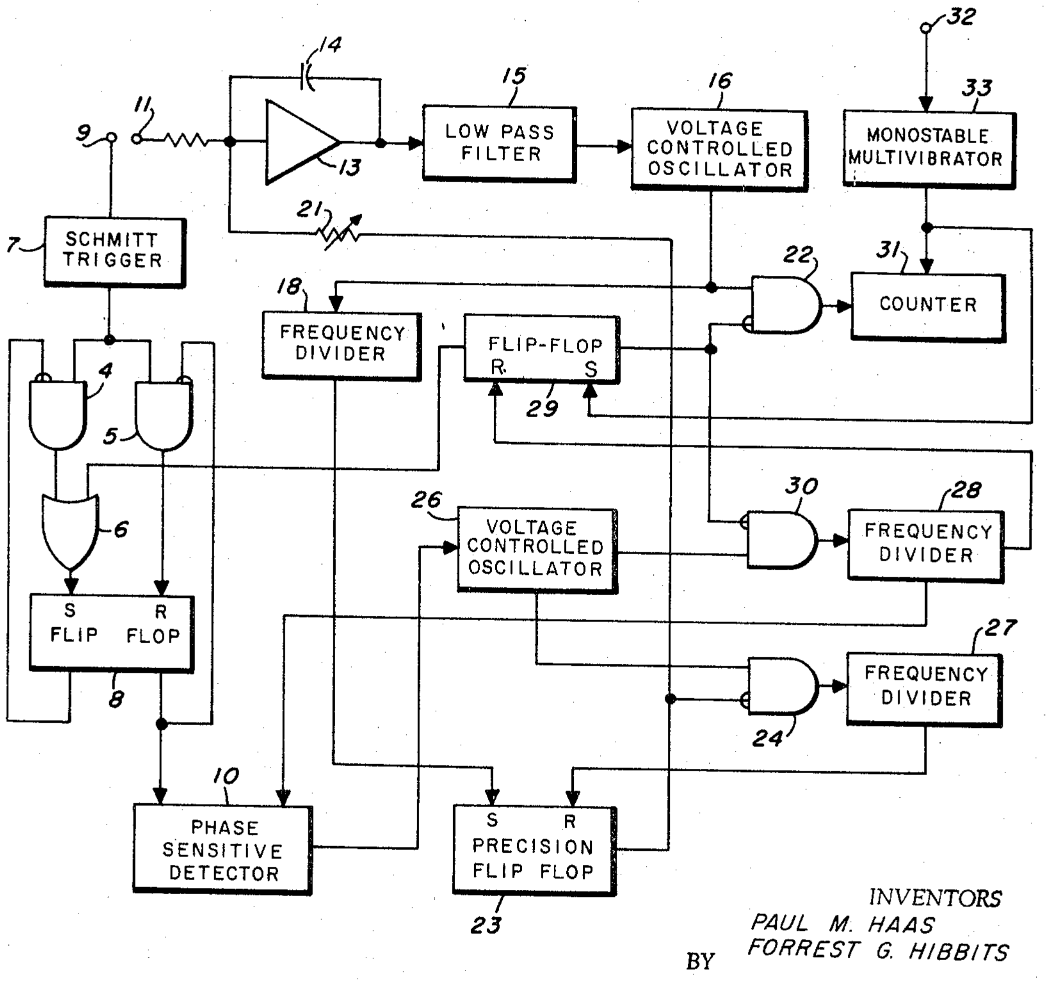

Other objects and many of the attendant advantages of this invention will be readily appreciated as the same becomes better understood by reference to the following detailed description when considered in connection with the accompanying drawing in which like reference numerals designate like parts throughout the figures thereof and wherein:

FIG. 1 is a block diagram showing the present invention in conjunction with existing integrating analog to digital converters; and FIG. 2 shows the present invention as utilized in conjunction with a specific analog to digital converter.

Referring to FIG. 1, input terminal 11 is connected to integrating analog to digital converter 41. Integrating analog to digital converter 41 has a timing output connected to one input of phase sensitive detector 10. Another input of phase sensitive detector 10 is connected to input terminal 9. The output of phase sensitive detector 10 is connected to a timing input of integrating analog to digital converter.

Referring to FIG. 2, input terminal 11 is connected through resistance 12 to the input of integrator amplifier 13. The output of integrator amplifier 13 is connected through low pass filter 15 to voltage controlled oscillator 16. Integrating capacitor 14 is connected from the output of integrator amplifier 13 back to its input. The output of voltage controlled oscillator 16 is connected to frequency divider 18 the output of which is connected to the set input of precision flip-flop 23. The output of precision flip-flop 23 is connected to the enable input of And gate 24 and through variable resistance 21 to the input of integrator amplifier 13.

Terminal 32 is connected to the trigger input of monostable multivibrator 33, the output of which is connected to counter 31 and the set input of flip-flop 29. The output of flip-flop 29 is connected to the enable inputs of And gates 22 and 30. Voltage controlled reference frequency oscillator 26 has an output connected to the signal inputs of And gates 30 and 24. The output of And gate 24 is connected to frequency divider 27, the output of which is connected to the reset input of precision flip-flop 29. The output of And gate 30 is connected to frequency divider 28, the output of which is connected to the reset input of flip-flop 29.

Frequency divider 28 has an intermediate output which is connected to one signal input of phase sensitive detector 10. Input terminal 9 is connected to Schmidt-trigger 7 the output of which is connected to flip-flop 8 through And gates 4 and 5. One output of flip-flop 8 is connected to another signal input of phase sensitive detector 10 and to an enable input of And gate 5. The output of phase sensitive detector 10 is connected to control input of voltage controlled reference frequency oscillator 26. Another output of flip-flop 8 is connected to an enable output of And gate 4, the output of which is connected to one input of flip-flop 8 through And gate 6. An output of flip-flop 29 is also connected to an input of And gate 6.

OPERATION

Referring to FIG. 1, the general philosophy of the invention is shown. A voltage to be measured or digitized by the integrating analog to digital converter 41 is applied at input terminal 11. The applied voltage is a DC level and if any interfering AC is present at this input terminal erratic or erroneous readings at the readout of the analog to digital converter can be produced. When this interfering signal is known, a sample of it is coupled to input terminal 9 and applied as one input to phase sensitive detector 10. A signal is taken from the recycling or timing system of integrating analog to digital converter 41 and applied as a second signal input to phase sensitive detector 10. The output of phase sensitive detector 10 is applied to the timing or recycling system of integrating analog to digital converter 41 to control the readout period of the analog to digital converter. If the readout period of the analog to digital converter is an integral number of cycles of the interfering signal, the interfering AC signal will not affect the output reading since the integral of a whole number of cycles of an AC signal is zero. If this is not true, phase sensitive detector 10 will detect an error and its output will change the readout time of the integrating analog to digital converter 41 until it coincides with a whole number of cycles of the interfering AC signal which will be evidenced by zero output of phase sensitive detector 10 and the system will be in balance.

Referring to FIG. 2, the instant invention is shown in conjunction with the analog to digital converter of the above-referenced co-pending application. Since the analog to digital converter portion of FIG. 2 has been ex-explained in the parent application, a detailed description is deemed unnecessary. However, in the interest of clarity, a general explanation will follow. An input potential at input terminal 11 is integrated in integrator amplifier 13, the output of which is passed through low pass filter 15 to control the frequency of voltage controlled oscillator 16. This frequency is divided in frequency divider 18 to set precision flip-flop 23, the output of which is coupled back as a feedback voltage to the input of integrator amplifier 13.

The signal supplied by reference frequency oscillator 26 (shown as voltage controlled oscillator 26 in FIG. 2) is then passed through And gate 24, the output of which is divided in frequency divider 27 to reset precision flip-flop 23. A cycling or time base start signal is applied at terminal 32 which triggers monostable multivibrator 33 and starts counter 31 counting the output of And gate 22. Monostable multivibrator 33 also sets flip-flop 29 which enables And gate 30 and allows frequency divider 28 to count down the output of voltage controlled reference frequency oscillator 26. At some later time an output from frequency divider 28 rests flip-flop 29 which inhibits And gate 22, stopping the output of voltage controlled oscillator 16 from passing to counter 31, and the count cycle is completed.

An output from flip-flop 29 is taken, as shown, to reference the phase of flip-flop 8 to the timing system of the analog to digital converter via gate 6. An intermediate output from frequency divider 28 is applied as an input to phase sensitive detector 10 along with the output of flip-flop 8. The output of phase sensitive detector 10 is applied as a control input to voltage controlled reference frequency oscillator 26 which in turn controls the entire timing or recycling system of the analog to digital converter.

If the two input signals have a phase or frequency such that one is a submultiple of the other, phase sensitive detector 10 will have an output to hold voltage controlled reference frequency oscillator at a constant frequency.

If this phase or frequency varies, causing an error due to the interference signal at the output of the analog to digital converter, the output from phase sensitive detector 10 will cause voltage controlled reference frequency oscillator 26 to change its frequency which, in turn, changes the readout time of the analog to digital converter to equal an integral number of cycles of the AC interference signal.

The purpose of referencing the phase of flip-flop 8 to the timing of analog to digital converter is to give the control of voltage controlled frequency oscillator 26 a sense. Hence, the output of phase sensitive detector 10 will drive the frequency of voltage controlled reference frequency oscillator 26 in the proper direction to correct for deviations and bring the counting time in synchronization with the AC interference signal.

It should be understood of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. In an integrating analog to digital converter having a readout timing means, the improved interference signal rejection system comprising:

(a) a phase sensitive detector having an output and first and second inputs, said first input adapted to be coupled to an interfering signal;

(b) an output from said readout timing means coupled to said second input; and (c) a voltage controlled control means for controlling said readout timing means, said voltage controlled control means having an input coupled to said phase sensitive detector output and having an output connected to said readout timing means.

2. The improved interference signal rejection system in an integrating analog to digital converter having a readout timing means of claim 1 wherein said voltage controlled control means comprises a voltage controlled oscillator.

3. In an integrating analog to digital converter having a readout timing means, the improved interference signal rejection system comprising:

(a) a phase sensitive detector having an output and first and second inputs, said first input adapted to be coupled to an interfering signal;

(b) an output from said readout timing means coupled to said second input;

(c) a voltage controlled control means for controlling said readout timing means, said voltage controlled control means having an input coupled to said phase sensitive detector output and having an output connected to said readout timing means; and (d) phasing means coupled to said readout timing means and said phase sensitive detector first input for referencing the phase of any interfering signal to said readout timing means.

4. The improved interference signal rejection system in an integrating analog to digital converter having a readout timing means of claim 3 wherein said voltage controlled control means comprises a voltage controlled oscillator.

5. The improved interference signal rejection system in an integrating analog to digital converter having a readout timing means of claim 3 wherein said phasing means comprises a flip-flop having a first input coupled to said interfering signal, a second input coupled to said readout timing means, and an output coupled to said phase sensitive detector input.

No references cited.

DARYL W. COOK, *Acting Primary Examiner.*

J. H. WALLACE, Jr., *Assistant Examiner.*